United States Patent [11] 3,552,685

[72] Inventor Raymond B. Larsen
Riverton, Wyo.
[21] Appl. No. 765,839
[22] Filed Oct. 8, 1968
[45] Patented Jan. 5, 1971
[73] Assignee Datel Corporation
Falls Church, Va.
a corporation of Delaware

[54] TAPE TRANSPORT ASSEMBLY

11 Claims, 7 Drawing Figs.

[52] U.S. Cl. 242/194
[51] Int. Cl. G03b 1/04, G11b 15/32
[50] Field of Search 242/197, 203, 194, 76

[56] References Cited

UNITED STATES PATENTS

| | | | |
|---|---|---|---|
| 3,042,331 | 7/1962 | Bierman | 242/194 |
| 3,173,623 | 3/1965 | Schoebel | 242/194 |
| 3,250,481 | 5/1966 | Seki | 242/194 |

*Primary Examiner*—Leonard D. Christian
*Attorney*—John E. Reilly

ABSTRACT: The present invention is adapted for use with a tape transport system of the type having coaxial supply and pickup reels with a spring member to maintain a constant tension on the tape as it is threaded past the capstan. In accordance with the present invention a unique form of guide roll assembly is enclosed within the tape cartridge to guide the tape across the capstan without binding or stretching and without necessitating removal of the tape from the cartridge; and further a brake mechanism is cooperative with a pressure roll to effect instantaneous braking by direct engagement with at least one of the reels.

INVENTOR.
RAYMOND B. LARSEN
BY
John F. Reilly
ATTORNEY

INVENTOR.
RAYMOND B. LARSEN
BY
John E Reilly
ATTORNEY

TAPE TRANSPORT ASSEMBLY

This invention relates to a novel and improved tape transport assembly for storage and retrieval of information on a sound recording and reproducing medium, such as, magnetic tape.

In magnetic tape recorders, it is desirable to provide means for threading the tape past the recording/reproducing head without necessitating its removal from the cartridge but at the same time insuring that the tape is accurately aligned and guided past the head in such a way as to prevent binding, stretching or distortion. Moreover, it is highly desirable that an effective means of braking be employed in association with the tape cartridge which will effect instantaneous braking of either one or both of the supply and pickup reels, and further will effect instantaneous braking independently of the capstan drive. For example, the present invention has particular utility in coaxial tape transport systems of the type shown in the U.S. Pat. No. 2,996,264 to Bygdnes wherein a constant torque spring, commonly referred to as a Neg'ator spring, is utilized to maintain constant tension on the tape, or substantially so, notwithstanding differential rotation of the supply and pickup reels in winding and unwinding the tape.

A feature of the present invention is to provide a guide roll arrangement which can be mounted internally of the tape cartridge and used in association with coaxial reels for advancement of the tape between the capstan and pressure roller without removal from the tape cartridge. A related feature is to provide a braking mechanism which may be positioned externally of the cartridge and selectively energized to advance the pressure roll into braking engagement with one of the coaxial reels whereby to effect instantaneous braking without interrupting the capstan drive.

It is therefore an object of the present invention to provide for a novel and improved form of tape transport assembly for accurately guiding a tape between coaxial reels for recording or reproducing purposes.

It is another object of the present invention to provide in tape transport system for a novel and improved form of guide roll arrangement capable of advancing the tape between a pair of tape reels for recording or reproducing information on the tape without removing the tape from the tape cartridge.

It is a still further object of the present invention to provide in a tape transport system for a novel and improved braking member which is capable of performing instantaneous braking without necessitating interruption of the capstan drive and having particular utility in coaxial reel, constant torque spring tape drive systems.

It is an additional object and advantage of the present invention to provide for a tape cartridge which is compact, highly simplified in construction and economical to manufacture, assemble and maintain, and being specifically conformable for use in association with coaxial reel drives.

In accordance with the present invention, the series of guide rolls are positioned internally of a tape cartridge in a housing for a pair of coaxial tape reels, and the guide rolls are so positioned and arranged with respect to one another and to the reels as to guide the tape past a recorder/reproducing head without binding or tape distortion. Since the tape must necessarily follow an inclined path of travel between the supply and takeup reels, the guide rolls will cause the tape to follow a straight path across the read/write head while inclining in opposite directions away from the supply reel and onto the takeup reel without binding or distortion over a relatively short path of travel. Thus when the tape cartridge is mounted on a horizontal platform or table, the tape is guided by the rollers horizontally in a straight line across one end of the cartridge, the end of the cartridge being recessed to permit direct contact by the capstan drive and read/write head without removal of the tape from the cartridge. Moreover, an electromagnetic brake member is mounted externally of the cartridge and is selectively movable past the tape into engagement with a pivotal pressure roll so as to force the pressure roll inwardly into braking engagement with one of the coaxial reels. Thus the brake simultaneously effects release of the pressure roll from the tape and inward movement of the roll against one or both of the tape reels to cause instantaneous braking. Preferably, the coaxial tape reel drive is of the type employing a constant torque spring whereby to maintain constant tension on the tape on opposite sides of the transducing element, such as, the tape transport system disclosed in the U.S. Pat. No. 2,996,264 to Bygdnes; and it is therefore most desirable to brake one reel only and permit the other reel to take up any slack introduced in the tape when the one reel is braked.

The above and other objects, advantages and features of the present invention will become more readily understood from a consideration of the following detailed description and accompanying drawings, in which.

Figure 1:
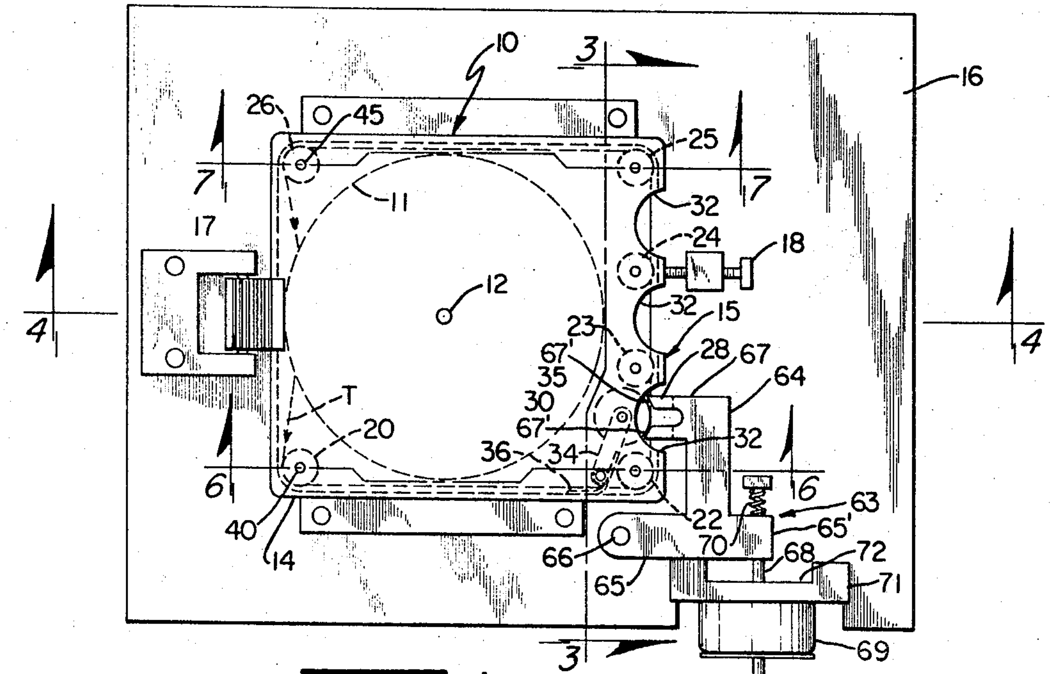
FIG. 1 is a top plan view of a preferred form of tape transport assembly, in accordance with the present invention.
Figure 2:
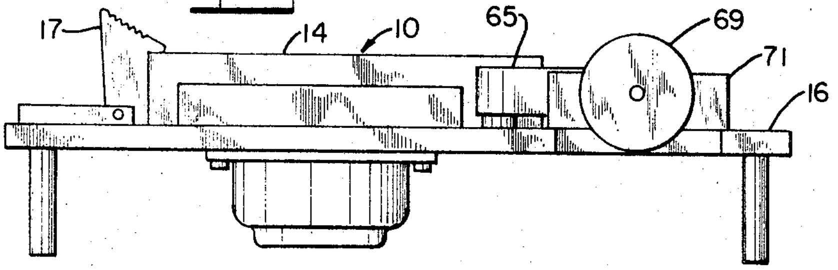
FIG. 2 is a side elevational view of the preferred form of tape transport assembly shown in FIG. 1.

Referring in more detail to the drawings, there is shown in FIGS. 1 to 4 a tape drive assembly according to the present invention in which a pair of coaxial reels 10 and 11 are mounted on a shaft 12 within a tape cartridge 14 having an exposed end 15. The tape cartridge is clamped on a tape deck 16 by a spring-biased latch 17 and an adjustable retention member 18. In the form shown, a magnetic tape T extends between the lower tape reel 10 past a series of guide rolls mounted internally of the cartridge to the upper takeup reel 11. Thus when the tape is moving in the direction of the arrows in FIG. 1 it is advanced to past a first guide roll 20 at one corner of the cartridge then forwardly past guide rolls 22, 23, 24 and 25 arranged at equally spaced intervals across the front exposed side of the cartridge and is returned rearwardly and upwardly past guide roll 26 onto the takeup reel. A drive capstan 28 is arranged opposite to a pivotal pinch roller 30 for the purpose of driving the tape at a regulated speed across a transducer, not shown, but located adjacent to the capstan along the exposed end for the purpose of reading or writing information on the tape. The exposed end 15 of the cover has equally spaced semicircular recesses or grooves 32 alternately disposed between the guide rolls 22 and 25 with the drive capstans 28 and 30 being aligned to engage the tape in a recessed portion 32 between guide rolls 23 and 24. In addition, the pinch roll 30 is mounted on a lever arm 34 pivoted about pin 35 behind the guide roll 25, and a coil spring element 36 on the pin normally urges the pinch roller in an outward direction through the recess 32 into engagement with the surface of the drive capstan. However, the pinch roll is pivotal under positive pressure away from the drive capstan into engagement with the relatively thick peripheral edge 10' of the lower tape reel 10 in order to brake the reels in a manner to be described in more detail.

Figure 3:
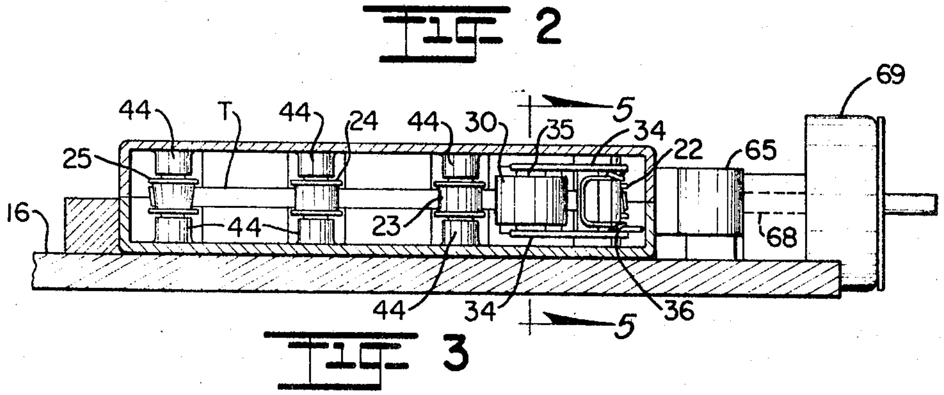
FIG. 3 is a sectional view taken on lines 3–3 of FIG. 1.
Figures 4, 5, 6, 7:
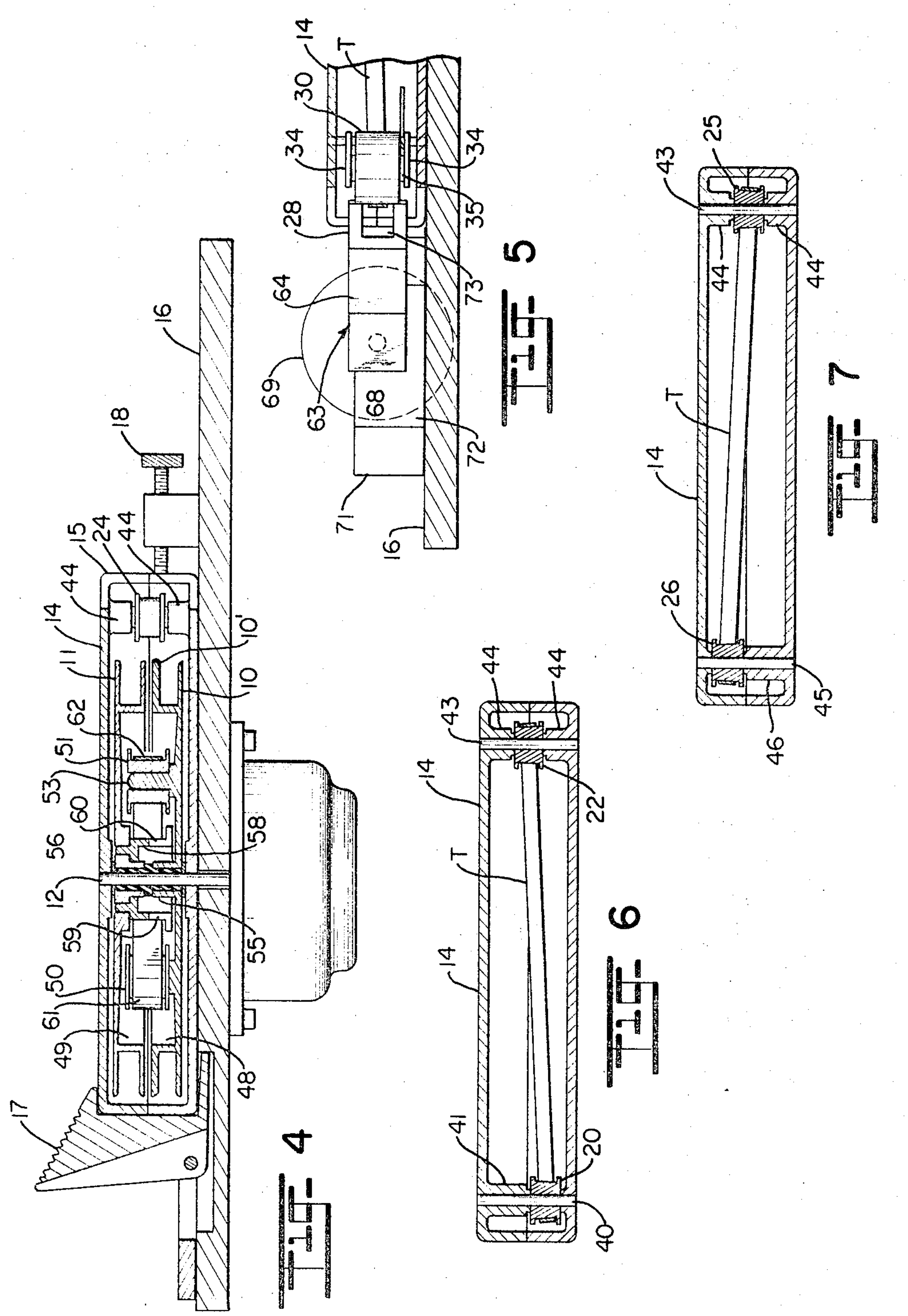
FIG. 4 is a sectional view taken on lines 4–4 of FIG. 1.
FIG. 5 is a sectional view taken on lines 5–5 of FIG. 3.
FIG. 6 is a sectional view taken about lines 6–6 of FIG. 1.

In a coaxial reel drive of the type described it is important that the tape in advancing across the capstan drive and transducer follow a horizontal path for accurate reading or writing on the tape and to avoid possible stretching, binding or distortion. To this end, the corner guide roll 20 is journaled for rotation on a pin 40 and is positioned by a spacer 41 so as to be aligned with the lower reel 10 and permit the tape to pass horizontally from the lower reel across the guide roll. The external surface of the guide roll is substantially in the form of a truncated cone and is given a downward taper so that the tape is caused to incline upwardly from the guide roll 20 toward the corner guide roll 22, as shown in FIG. 6. Guide rolls 22, 23 and 24 are each journaled on a separate pin 43 intermediately between upper and lower spacer elements 44 at a point midway between the upper and lower reels and in horizontal aligned relation to one or the other of the guide rolls 23 and 24, as shown in FIG. 3. In addition, the corner guide roll 22 has an external surface which is similarly in the shape of a truncated cone but is given a reverse taper to that of the guide roll 20 and at the same degree of inclination so that the tape is returned from its upwardly inclined path of travel into a horizontal path of travel across the guide rolls 23 and 24 as well as the capstan and transducer. Accordingly, the guide rolls 23 and 24 are of uniform diameter to retain the tape in a horizontal path along the exposed end 15.

The guide roll 25 is mounted in a similar fashion to that of guide roll 22 intermediately between upper and lower spacers 40 and 44 but with the taper on the guide roll reversed to that of guide roll 22 thereby permitting the tape to move upwardly across the guide roll 25 along an inclined path of travel toward the upper corner guide roll 26, as shown in FIG. 7. Here the upper guide roll 26 is mounted on pin 45 on spacer element 46 in horizontal alignment with the upper reel 11, and the taper of the guide roll 26 is once again reversed to that of the guide roll 25 so as to cause the tape to return to a horizontal path of travel for movement onto the upper takeup roll. As a result, the tape can be advanced by the series of guide rolls past the transducer without removal from the cartridge and without binding or stretching of the tape. It will be observed in this connection that the tape may be driven in either direction so that for example, the lower reel may act as the supply reel and the upper reel 10 may act as the takeup reel and the guide rolls will function in the same manner to effectively guide movement of the tape between reels in the manner described.

In a coaxial reel drive of the type described it is desirable to maintain constant tension on the tape as it is driven between the supply and takeup reels and specifically in such a way as to compensate for differences in speed of rotation between the tape reels as the tape is removed from one reel onto the other reel. A constant torque spring system is set forth and described in U.S. Pat. No. 2,996,264 and, for the purpose of illustration, the system disclosed therein is incorporated between the coaxial reels 10 and 11 of the present invention, as broadly shown in FIG. 4. The essential elements and their intended cooperation in maintaining constant tension on the tape reels will be hereinafter described, but for a detailed understanding and comprehension of the constant spring torque system, reference is made to U.S. Pat. No. 2,996,264. As shown in FIG. 4, the supply and takeup reels 10 and 11 are coaxially mounted on the shaft 12 and the reels are provided with annular spaces 48 and 49 formed inwardly of the tape receiving grooves. When assembled the cavities are disposed in inwardly facing relation to one another to form a common cavity for the constant torque spring system. It will be seen that a pair of spring drums 50 and 51 are rotatably mounted on upstanding pins 53 which project upwardly into the common cavity from the lower flange of the takeup reel. In turn, a bushing 55 projects upwardly from the reel 10 and bushing 56 projects downwardly from the upper reel; and a spring motor hub 58 also projects downwardly from the upper reel in outer spaced concentric relation to the bushing. The hub is provided with diametrically opposed slots 59 and 60 for attachment of the free ends of torque or Neg'ator springs 61 and 62 on the spring drums 50 and 51 respectively. In the manner shown in U.S. Pat. No. 2,996,264 the springs are wrapped in a bifilar manner about the spring motor hub. Thus as the tape is advanced or threaded past the drive capstan and is removed from the supply reel the supply reel is rotated to cause the spring motor hub to rotate and to transmit torque through the springs to the spring motor drums whereby to drive the takeup reel 11 and wind up the tape from the supply reel. Under rotation the springs will be wound upon the respective drums and tend to unwind or wind from their respective drums according to the relative speeds of rotation of the supply and takeup reels thereby maintaining substantially constant tension at all times and minimizing introduction of slack into the tape on the takeup side.

In order to brake the tape drive without interrupting motor operation of the drive capstan, an improved form of brake member 63 is mounted on the tape deck for movement between a normally inactive position, as shown in FIG. 1, and a braking position in which the brake engages the pinch roller 30 and forces it against the roller flange surface 10' of the supply reel. For this purpose, the brake member includes a lever arm 64 extending forwardly from and normal to a pivotal arm 65, the latter being pivoted at 66 and extending in spaced parallel relation to the free end 67 of the arm 64. An extension 65' on arm member 65 is normally engaged by a plunger 68 within solenoid 69, and a spring return 70 in front of the extension 65' normally retains the brake in inoperative position. It will be noted that the free end 67 is bifurcated or slotted to include a central slot 72 in which the capstan is inserted, and the bifurcated portions include beveled end surfaces 67'. The bifurcated end of the arm is also provided with a transverse slotted portion 73 of sufficient width to permit free passage of the tape therethrough. When the solenoid 69 is energized the plunger 68 is driven forwardly to pivot the free end 67 inwardly about the pivot 66 and to force the pinch roll 30 inwardly away from the drive capstan and against the relatively thick flange of the supply reel 10. Preferably the pinch roll has a frictional outer surface of rubber or rubberlike material and when advanced inwardly by the brake shoe 67 will frictionally engage the supply reel to brake its rotation. Braking of the supply reel is transmitted through the spring motor drive system to the takeup reel; however the takeup reel is free to undergo limited rotation independently of the supply reel to remove any slack from the tape caused by braking of the supply reel.

The coaxial reel drive of the present invention results in an extremely compact efficient system whereby the tape can be advanced internally of the cartridge without binding and stretching and permits accurate recording and reproducing as well as instantaneous braking without interrupting or switching off the capstan drive. When braking in the manner set forth, the slack in the tape is removed by the takeup reel so that when the brake is released the capstan will continue to drive the tape under constant tension. Of course the guide roll and braking systems described are readily conformable for use with other tape transport systems than the coaxial reel drive as herein described. It is therefore to be understood that various modifications and changes may be made in the construction and arrangement of parts without departing from the spirit and scope of the present invention.

I claim:

1. A tape transport system comprising a supply reel, a takeup reel, a series of roller members for guiding movement of a tape between said reels including a brake roller movable into engagement with at least one of said supply and takeup reels, said supply and takeup reels being coaxially mounted for rotation about a common axis, and a cartridge enclosing said rollers and reel members, means correlating rotation of said supply and takeup reels as the tape is advanced therebetween, and braking means selectively activated to advance said brake roller into braking engagement with one of said reels whereby to stop rotation of said supply and takeup reels.

2. A tape transport system according to claim 1 in which a drive capstan is engageable with the tape, said brake roller defined by a pivotal pressure roller biased against the capstan to advance said tape between said supply and takeup reels, and said brake means selectively activated to engage said pressure roller and pivot same away from said capstan into engagement with said supply reel while simultaneously locking said pressure roller against rotation.

3. In a tape transport system having coaxial supply and takeup reels and means correlating rotation of said reels for advancement of a tape under constant tension therebetween, the combination therewith of guide roll means for guiding movement of the tape between said reels including at least one roller pivotally mounted for movement between a position in the guide path of advancement of the tape and a position contacting an outer peripheral edge of at least one of said reels, means normally urging said one roller away from contact with the reels, and braking means associated with said one roller being selectively activated to urge said one roller against one of said reels to lock said reels against rotation.

4. In a tape transport system according to claim 3, further including a tape cartridge enclosing said reels and said guide roll means, said guide roll means arranged at spaced intervals within said cartridge on axes parallel to the reel axis and further arranged to guide the tape across an opening along an open end of said cartridge, said one pivotal roller defined by a pressure roller mounted within said cartridge for movement between a position normally engaging the tape as it is advanced between said guide rollers and a position pivoted away from the tape into engagement with an outer peripheral edge of one of said supply and takeup reels for braking rotation of said reels.

5. In a tape transport system according to claim 4, said braking means including a pivotal arm member disposed externally of said cartridge and having a slotted free end portion movable inwardly through the open end of said cartridge past said tape into engagement with said pressure roller.

6. In a tape transport system according to claim 5, said brake arm being solenoid-controlled to urge said pressure roller into braking engagement with said supply reel without interrupting said capstan drive.

7. In a tape transport system having a tape cartridge, and coaxial supply and takeup reels mounted for rotation about a common axis within said cartridge for advancement of a tape therebetween, the combination therewith of a capstan drive engageable with the tape to advance same between the reels, guide rollers at spaced intervals within said cartridge arranged to guide the tape to and from said capstan drive in a path of travel parallel to its direction of travel in passing onto and from said takeup and supply reels, said guide rollers having tape-contacting roller surfaces for guiding advancement of the tape internally of said cartridge along a first inclined path of travel from said supply reel into a guide path parallel to said reels along said capstan drive and a second inclined path of travel onto said takeup reel.

8. In a tape transport system according to claim 7, said guide rollers including guide rollers on opposite sides of said capstan drive having tape-contacting roller surfaces disposed at an angle to the reel axis of rotation to guide the tape along the inclined paths leading into and away from the guide path across said capstan drive.

9. In a tape transport system according to claim 7, said tape cartridge being of generally flat rectangular configuration with an open end portion at one end opposite the point of removal and return of the tape on said supply and takeup reels, respectively, said guide rollers establishing the first inclined path of travel for the tape from the supply reel into a guide path along the open end of said cartridge parallel to said reels and the second inclined guide path from the open end of said cartridge onto said takeup reel, and said capstan drive being engageable with the tape along the open end of said cartridge.

10. In a tape transport system according to claim 7, said guide rollers including a guide roller at each corner of said tape cartridge having tape-contacting roller surfaces disposed at an angle to the reel axis whereby to establish the inclined paths of travel into and away from the guide path along the open end of said tape cartridge.

11. In a tape transport system according to claim 10, there being a pair of corner guide rollers in the path of travel between each reel and the guide path along the open end of said tape cartridge, each of said roller pairs being disposed for rotation about an axis parallel to the reel axis and the rollers of each pair having conical tape-contacting roller surfaces tapered in opposite directions to one another to cause the tape to undergo successive changes in direction of travel between said reels.